(12) United States Patent
Cauwels et al.

(10) Patent No.: US 7,734,316 B2
(45) Date of Patent: Jun. 8, 2010

(54) USER-SPECIFIED OUTPUTS IN MOBILE WIRELESS COMMUNICATION DEVICES AND METHODS THEREFOR

(75) Inventors: Patrick Cauwels, South Beloit, IL (US); Steven Herbst, Chester, NJ (US); David Roller, Green Oaks, IL (US); Peter Wyatt, San Francisco, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/233,212

(22) Filed: Aug. 30, 2002

(65) Prior Publication Data

US 2004/0203508 A1    Oct. 14, 2004

(51) Int. Cl.
*H04B 1/38*  (2006.01)
*H04M 1/00*  (2006.01)

(52) U.S. Cl. .................. 455/572; 455/566; 455/575.1

(58) Field of Classification Search ............. 455/566, 455/435.1, 567, 574, 575.1–575.4, 344, 343.1, 455/347, 41.2, 41.3, 343.4, 556.1, 418, 572, 455/550.1, 566.1

See application file for complete search history.

(56) References Cited

U.S. PATENT DOCUMENTS

| 5,870,683 | A | * | 2/1999 | Wells et al. ................. 455/566 |
| 6,149,442 | A |   | 11/2000 | Enright |
| 6,278,887 | B1 | * | 8/2001 | Son et al. .................... 455/566 |
| 6,342,738 | B1 |   | 1/2002 | Lutnaes |
| 6,385,466 | B1 |   | 5/2002 | Hirai et al. |
| 6,426,736 | B1 |   | 7/2002 | Ishihara |
| 6,973,336 | B2 | * | 12/2005 | Heie ......................... 455/574 |
| 2001/0024967 | A1 | * | 9/2001 | Bauer ........................ 455/574 |
| 2002/0183004 | A1 | * | 12/2002 | Fulton et al. ................. 455/41 |

OTHER PUBLICATIONS

Publ. on Mar. 2001. User's Manual for mobile phone Ericsson T39 found in Internet: http//mobile.optima.ua/manual.php?manual_id=63 (pp. 23, 24, 70-77).
Printed in Korea; Code No.: GH68-03299A; English. Jan. 2003. Rev.1.0; Electronics Dual Band GSM Telephone; SGH-T400; Owner's Manual; Global Systems for Mobile Communications.
Printed in Korea; Code No.:GH68-02777A; Eng. Mar. 2002. Rev.1.0; Electronics; World Wide Web www.samsungmobile.com; Dual Band GSM Telephone; SGH-T100; Owner's Manual Global Systems for Mobile Communications.
Publ. on Mar. 2001, User's Manual for mobile phone Ericsson T39 found in Internet: http://mobile.optima.ua/manual.php?manual_id=63.

* cited by examiner

*Primary Examiner*—Quochien B Vuong
(74) *Attorney, Agent, or Firm*—Roland K. Bowler, II

(57) ABSTRACT

A mobile wireless communication device, and methods therein, including producing a user-configurable sensory output (620) upon the occurrence of some event on the device, for example, the transition between sleep and active modes, or the mechanical actuation of a portion of the device. In some embodiments, the user-configurable sensory output terminates (630) after a specified time period. In other embodiments, a service provider selects the sensory output and associates it with a particular event that occurs on the device, whereupon the sensory output is produced on the device upon the occurrence of the event, for example, to communication information from the service provider.

17 Claims, 4 Drawing Sheets

USER-SPECIFIED OUTPUTS IN MOBILE WIRELESS COMMUNICATION DEVICES AND METHODS THEREFOR

FIELD OF THE DISCLOSURE

The present disclosure relates generally to mobile wireless communications devices, and more particularly to user enriching events in wireless communications devices, for example, in cellular communications handsets, and methods therefor.

BACKGROUND

As consumers in the competitive wireless cellular communications handset market become more sophisticated, the successful marketing of cellular handsets depends upon the ability of manufacturers and network providers to offer more than basic features. Cellular handsets are now viewed by many consumers as an apparel accessory item integrated as a part of the individual being. Consumers also increasingly desire the ability to customize and personalize their handsets, for example, as a form of self-expression, to reflect changes in mood or psychological disposition, to differentiate from others, to associate with peers, etc.

It is known to generate audio sounds upon the occurrence of specified events on cellular telephone handsets. The Motorola Timeport 280, for example, produces a sound when a charger cable is connected thereto. However, the user has no control over this signal. The Motorola V60 cellular handset enables the association of different user specified audio alerts with different incoming communications including calls and e-mail.

The various aspects, features and advantages of the present invention will become more fully apparent to those having ordinary skill in the art upon careful consideration of the following Detailed Description with the accompanying drawings described below.

DETAILED DESCRIPTION

Figure 1:
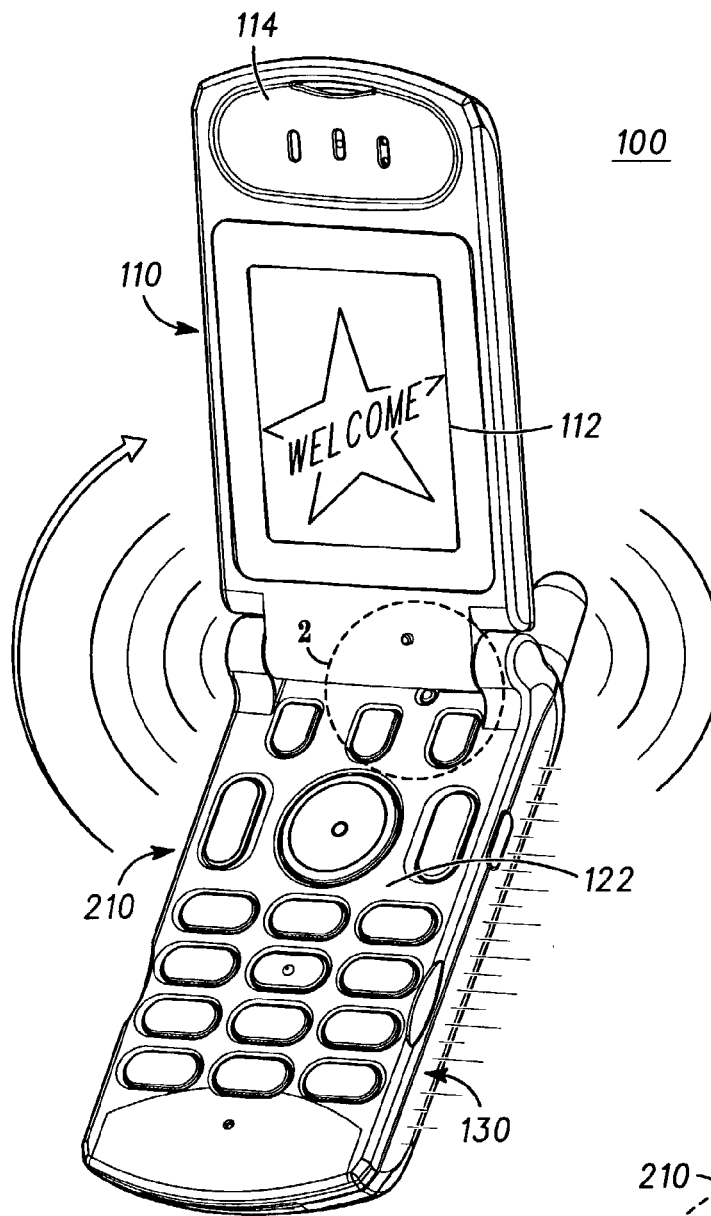
FIG. 1 is an exemplary mobile cellular communications handset having a pivoting panel.

In FIG. 1, an exemplary cellular handset 100 comprises a housing cover portion, or flip, 110 pivotally coupled to a housing 120. A user interface is exposed upon opening the flip 110. The exemplary user interface includes a display 112 and an audio output 114 on the cover portion, and an input keypad 122 including an alpha/numeric keys and other controls on the housing portion 120.

Figure 2:
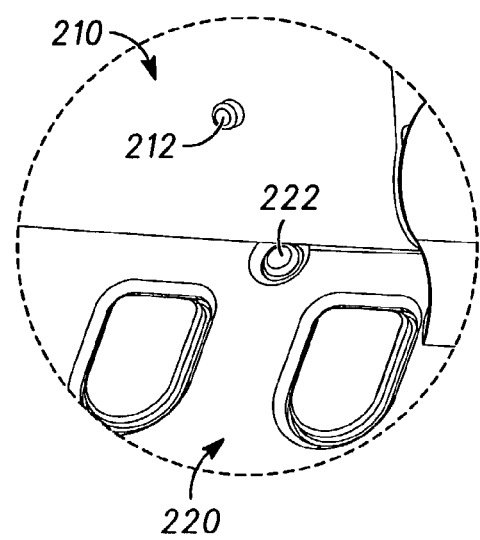
FIG. 2 is an exemplary cellular handset housing configuration detection switch.

In FIG. 1, the housing includes a switch for sensing whether the pivotal cover portion 110 is opened or closed relative to the housing. FIG. 2 is an enlarged view of the housing portion 220 including a cover position-detecting switch 222 disposed near the cover hinge. The switch is actuated upon pivoting the cover 210, which includes a protruding member 212 for engaging an actuating the switch. The switch and its location is only exemplary and is not intended to limit the invention, as many other switches and configurations are suitable for detecting the position of the pivoting cover.

In other embodiments, the housing may have a portion that rotates, for example, a blade that rotates to cover and expose a user interface. The blade position may be detected by a switch or by a rotary encoder, or by some other position detecting devices. Other handset housings include sliding housing covers or portions, the position of which may also be detected by a sensor or switch.

Figure 3:
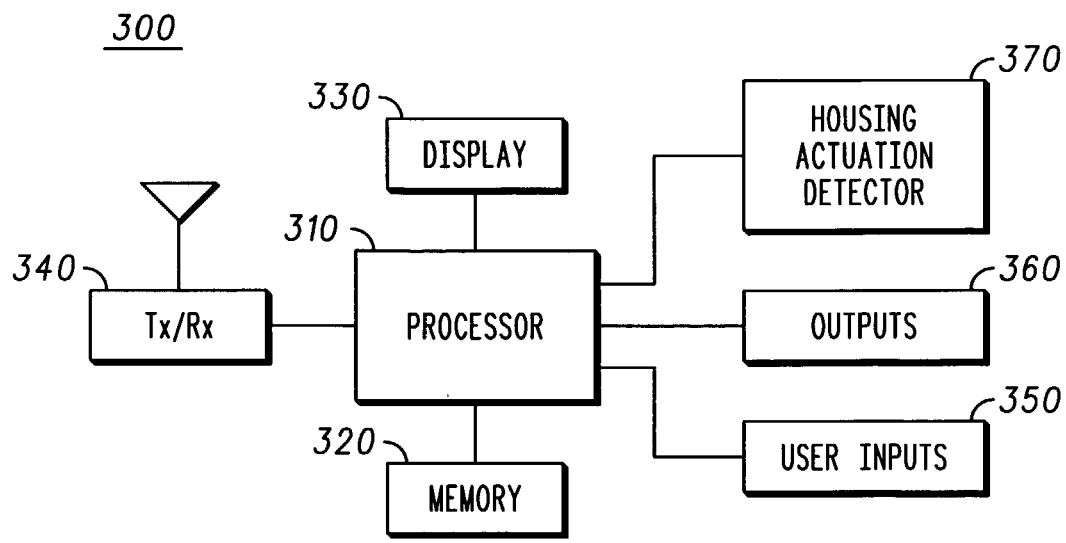
FIG. 3 is a schematic electrical block diagram for an exemplary cellular communications handset.

In FIG. 3, an exemplary schematic block diagram of a mobile wireless communications device 300 includes a processor 310 coupled to memory 320, a display 330, and a radio frequency (RF) transceiver 340. In one embodiment, the transceiver is for communicating within service provider networks. In other embodiments the wireless device also receives and transmits over small area networks, for example, via Bluetooth and/or IEEE 802.11b compliant transceivers.

In FIG. 3, user inputs 350, for example a microphone, keypad, scrolling input device, joystick, data input jack, infrared signal input, accessory connectors, etc., are also coupled to the processor 310. The processor is coupled to outputs 360, for example, to a speaker, an audio output jack, etc. The exemplary configuration is not intended to limit the disclosure, as the invention may be implemented in other architectures.

In FIG. 3, a housing actuation detector 370 is also coupled to the processor for indicating the position of a mechanically actuatable portion of the mobile wireless communications device, for example, a user interface cover or any other actuating portion of the device. For example, the housing actuation input 370 of FIG. 3 may correspond to the position-detecting switch 222 of FIG. 2, or to any other mechanically actuatable housing portion. The switch is not required in all embodiments of the invention. For example, some embodiments may not include an actuatable user interface cover.

Figure 4:
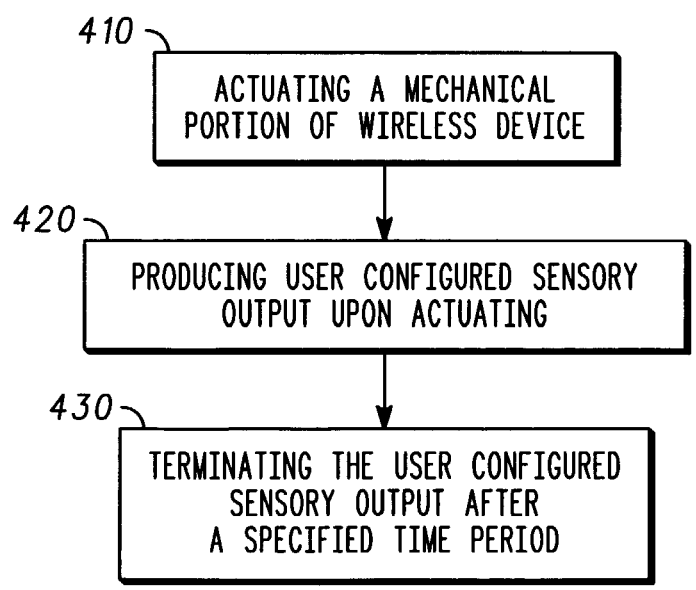
FIG. 4 is a process flow diagram for one exemplary cellular handset mode of operation.

In the process flow diagram of FIG. 4, at block 410, a mechanical portion of the wireless device is actuated. This actuation may be the translating or pivoting or rotating action of a housing cover portion or some other mechanically actuatable portion thereof. The actuation of the mechanical portion may also be the depression of one or more input keys, or the actuation of a switch, the extension of a retractable antenna, or the connection of an accessory, for example, a plug-in charger, a camera, ear phones, etc., to the device.

In FIG. 4, at block 420, a user-configurable sensory output of the mobile wireless communication device is produced upon actuating the mechanical portion of the mobile wireless communication device.

Figure 5:
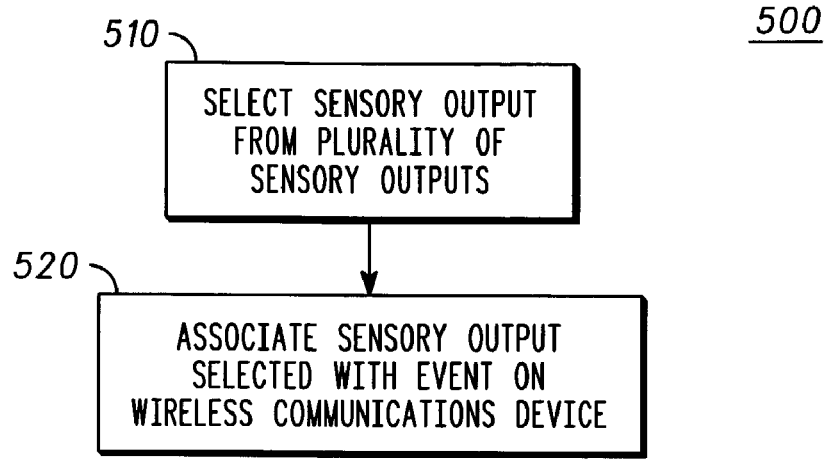
FIG. 5 is an exemplary process follow diagram for associating sensory output with an event occurring on a wireless communications handset.

In the process flow diagram 500 of FIG. 5, at block 510, the user selects a sensory output from a plurality of sensory outputs, for example, at a user configuration menu. At block 520, the selected sensory output is associated with a particular event on the wireless communication device.

The event selected at block 520 may be the mechanical actuation of a portion of the device, examples of which are discussed above, including the rotation or translation of a cover portion, or the depression of one or more input keys, the extension or retraction of a whip antenna, the opening or removal of a compartment, for example, a battery compartment cover or a face plate, or the actuation of some other mechanical portion of the device. In another embodiment, the user may select, or re-map, one or more sensory outputs associated with the depression of each input key.

In one embodiment, the user-configurable sensory output is an audio output, for example, a melodic sound, or an audio message, or some other sound clip. In some embodiments, the sound produced is related to the action performed, for example, a "Creeeeeak" sound may be produced as the cover pivots open, or a "Zzzzzzzip" sound may be produced as an antenna whip is withdrawn or retracted.

In other embodiments, the user-configurable sensory output is a tactile sensation, which may be in the form of a buzz or it may be a more melodic or rhythmic tactile sensation. In some embodiments, the tactile output is produced in concert with some other sensory output, for example, in synchronization with a melodic audio output.

The user-configurable sensory output may also be the production of a visual stimulation, for example, an image on the display. The visual image may be a still image or a dynamic video image, like a short video clip.

In FIG. 1, the wireless device 100 includes a vanity light 130 disposed along a side thereof, or on some other portions of the device, for emitting light upon the occurrence of a user specified event. In one embodiment, the visual sensory output is the illumination of one or more vanity lights upon the occurrence of the event specified at block 520 in FIG. 5. The sensory output may also be the illumination of the display alone or in addition to the illumination of the vanity lights. The lights may be configured to flash or provide steady brightness depending on the user's preferences. The lighting may also be synchronized with other sensory outputs, for example, with audio and tactile outputs.

In other embodiments, the user-sensory output may be a thermal output, for example, a change in temperature of the wireless device or a portion thereof, or an olfactory sensory output. Generally, one or more of the user-configurable sensory outputs may be produced in combination, either serially or in parallel, and in response to actuating the mechanical portion of the wireless device.

In some embodiments, at block 510 of FIG. 5, the user may also configure properties of the sensory output selected, for example, the audio volume, or the fade-in and fade-out of the sensory output, among others.

In FIG. 4, at block 430, in some embodiments, the sensory output terminates after a specified time period. In one embodiment, the user may specify that the sensory output fade-out slowly, for example, audio outputs may fade-out to an inaudible volume level.

In another embodiment, the event specified at block 520 in FIG. 5 is the transitioning of the wireless device between a reduced power consumption mode and a relatively higher power consumption mode, for example, between sleep and active modes. Wireless handsets generally transition from active mode to sleep mode after some period of inactivity to conserve power. The handset transitions to the active mode in response to some user input, for example, upon depressing an input key or upon actuating some other mechanical portion thereof. The user may specify whether the sensory output occurs when the device assumes the active or sleep mode, or both. Also, different events may be associated with the transition depending upon the direction of the change in state.

Figure 6:
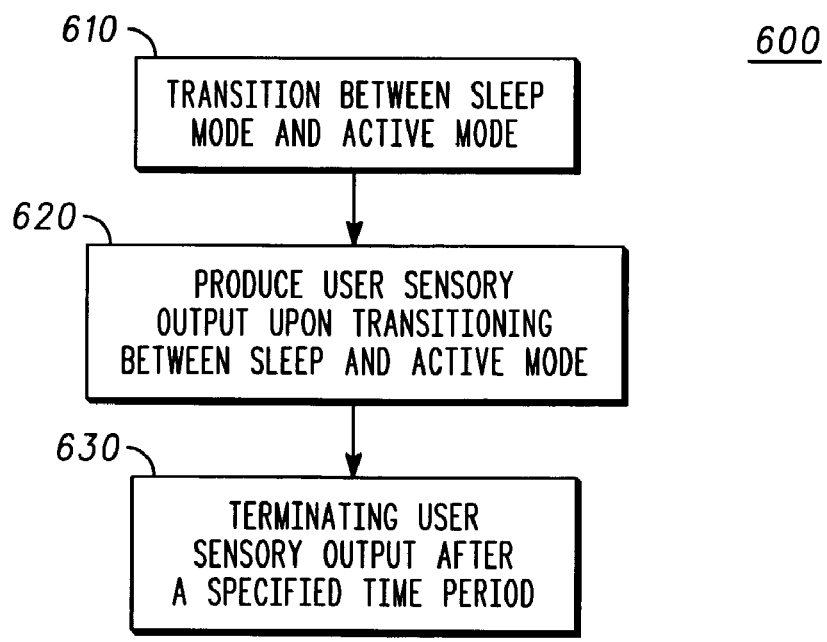
FIG. 6 is a process flow diagram for another exemplary cellular handset mode of operation.

In the process flow diagram 600 of FIG. 6, at block 610, the mobile wireless communication device transitions between a reduced power consumption mode and a relatively higher power consumption mode. Many events prompt the wireless device to transition between modes. The wireless device may transition between a sleep mode and active mode upon actuating a mechanical portion of the mobile wireless communications device, for example, by actuating a cover portion, depressing an input key or some other button or switch on the device.

In FIG. 6, at block 620, a user-configurable sensory output of the mobile wireless communication device is produced upon transitioning the mobile wireless communication device between modes.

In another embodiment, the event selected at block 520 in FIG. 5 is the transitioning between power-on and power-off modes of operation of the mobile wireless communication device. The user may specify whether the sensory output occurs when the device is turned ON and/or when it is turned OFF, and associate different output events depending upon the direction the transition. At block 520, one or more user-specified sensory outputs are associated with the transitioning between OFF and ON modes. Thereafter, upon applying or removing power, the associated sensory output is produced, according to the user's selection.

In some embodiments, the user-configurable sensory output terminates after a specified time period.

In another embodiment, the mobile wireless communication device receives information from a communications service provider associated with an occurrence of an event that occurs on the mobile wireless communication device, whereby the occurrence of the event initiates the production of the sensory output on the wireless device. The temporary sensory output thus communicates information received from the communications service provider upon the occurrence of the event. In this embodiment, the service provider selects the sensory output and associates it with an event, for example, when the mobile wireless communication device transitions between power-off and power-on modes of operation, or some other event.

In one embodiment, the sensory output that communicates information received from the communications network is the displaying of visual information, for example, a still image or a short video clip. In some embodiments corresponding audio and/or tactile information, also received from the service provider, is produced in concert with the visual information. According to this embodiment, the sensory output is controlled by the network service provider upon the occurrence of the specified event, for example, to communicate important service related information to the user from the service provider or from third parties. The service provider may update the information by transmitting new information to the wireless device, for example, in a broadcast message or in a point-to-point message.

Figure 7:
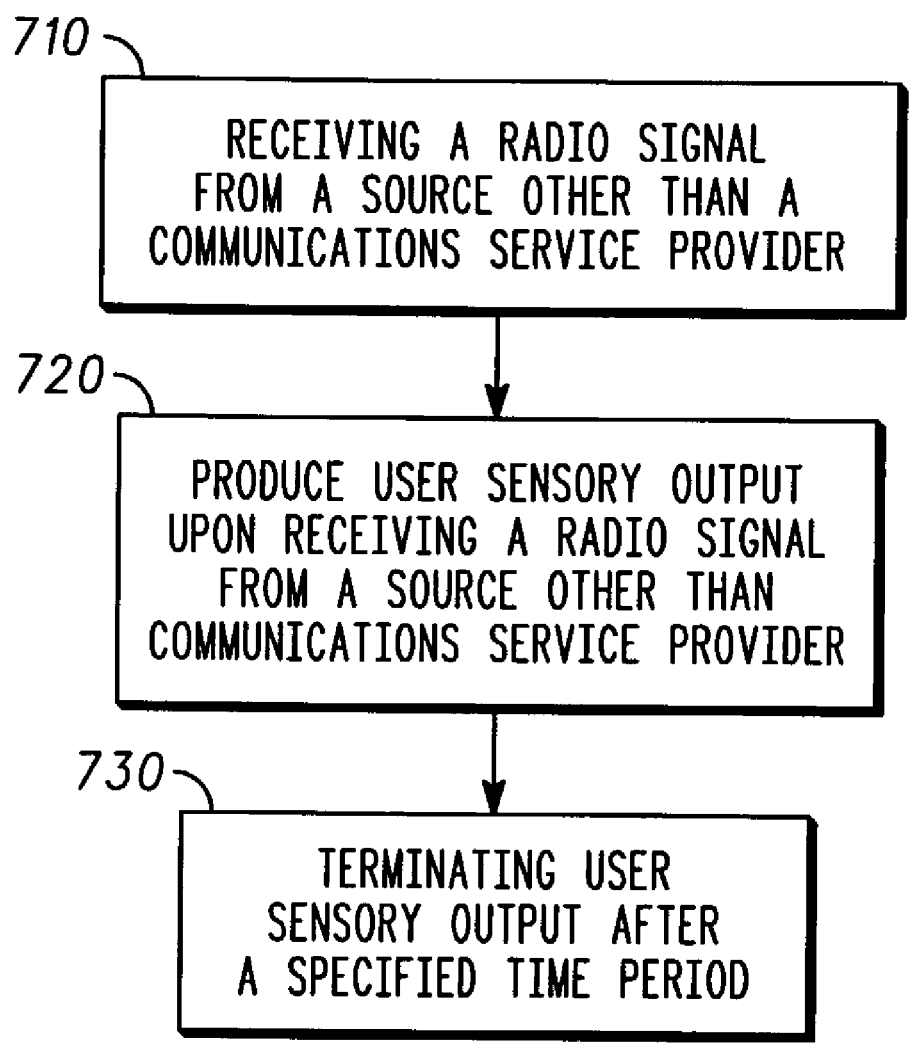
FIG. 7 is a process flow diagram for yet another exemplary cellular handset mode of operation.

In another mode of operation, illustrated in the process flow diagram 700 of FIG. 7, at block 710, the mobile wireless communication device undergoes a change in reception of a radio signal from a source other than the communications service provider, for example, a Bluetooth signal, an IEEE 802.11b signal, an infrared signal, or some other signal.

At block 720, a user-configurable sensory output of the mobile wireless communication device is produced upon undergoing a change in reception of the radio signal from the source other than the communications service provider. The sensory output may be, for example, an audio signal alerting the user that the wireless device is receiving the signal or no longer receiving the signal. A block 730, the user-configurable sensory output is terminated after a specified time period.

While the present disclosure and what is considered presently to be the best modes thereof have been described in a manner that establishes possession thereof by the inventors and that enables those of ordinary skill in the art to make and use the same, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method in a mobile wireless communication device, comprising:
   transitioning the mobile wireless communication device between sleep mode and active mode;
   producing a user-configurable sensory output of the mobile wireless communication device upon transitioning the mobile wireless communication device;
   terminating the user-configurable sensory output after a specified time period while the wireless communication device is in the mode to which it has transitioned.

2. The method of claim 1, producing the user-configurable sensory output by producing an audio output.

3. The method of claim 1, terminating the user-configurable sensory output by fading-out the user-configurable sensory output.

4. The method of claim 1, producing the user-configurable sensory output by producing a tactile sensation.

5. The method of claim 1, producing the user-configurable sensory output by temporarily displaying a visual image on a display of the mobile wireless communication device.

6. The method of claim 1, producing the user-configurable sensory output by emitting light from the mobile wireless communication device.

7. The method of claim 1, selecting the user-configurable sensory output from a plurality of sensory outputs.

8. A method in a mobile wireless communication device, comprising:
   selecting one of a plurality of sensory outputs of the mobile wireless communication device from a plurality of user-selectable sensory outputs;
   transitioning between sleep and active modes of operation of the mobile wireless communication device;
   producing the sensory output selected upon transitioning between the sleep and active modes of operation,
   the sensory output distinct from an output inherent to a mode to which the mobile wireless communication device is transitioned.

9. The method of claim 8, terminating the user sensory output by fading-out the user sensory output during operation in the mode to which the mobile wireless communication device has transitioned.

10. A method in a mobile wireless communication device, comprising:
    receiving, at the device, a communication containing information from a communications service provider;
    producing, at the device, a temporary sensory output that communicates the information received from the communications service provider upon the occurrence of an event,
    the event upon which the temporary sensory output is produced is different than receiving the communication containing the information.

11. The method of claim 10, producing the temporary sensory output by displaying video information received from the communications service provider upon the occurrence of the event.

12. The method of claim 11, the event prompting producing the temporary sensory output is the transitioning from a power-off mode to a power-on mode, producing the temporary sensory output that communicates information received from the communications service provider when the mobile wireless communication device is transitioned to a power-on mode.

13. The method of claim 10, producing the temporary sensory output by producing audio information received from the communications service provider with visual information.

14. The method of claim 10, producing the temporary sensory output by displaying a video message received from the communications service provider upon the occurrence of the event.

15. The method of claim 10, producing the temporary sensory output in a first mode of operation of the wireless communication device, and terminating the temporary sensory output while in the first mode of operation.

16. The method of claim 10,
    receiving, at the device, a communication containing updated information from the communications service provider,
    producing, at the device, the temporary sensory output that communicates the updated information received from the communications service provider upon the occurrence of the event.

17. A method in a mobile wireless communication device, comprising:
    actuating a mechanical portion of the mobile wireless communication device other than a power on/off control portion;
    temporarily displaying image information controlled by a network service provider on a display of the mobile wireless communication device before displaying a user interface home menu upon actuating the mechanical portion of the mobile wireless communication device;
    terminating the displayed image information after a specified time period.

* * * * *